No. 711,870. Patented Oct. 21, 1902.
P. KLINGER.
CARTRIDGE AND SHELL LOADER.
(Application filed Nov. 12, 1901.)
(No Model.) 6 Sheets—Sheet 2.

WITNESSES:
Fred D. Bradford.
Amos W Hart

INVENTOR
Peter Klinger
BY Munn & Co.
ATTORNEYS

No. 711,870. Patented Oct. 21, 1902.
P. KLINGER.
CARTRIDGE AND SHELL LOADER.
(Application filed Nov. 12, 1901.)

(No Model.) 6 Sheets—Sheet 3.

WITNESSES:
Fred P. Bradford
Amos W. Hart

INVENTOR
Peter Klinger.
BY Munn & Co.
ATTORNEYS

No. 711,870. Patented Oct. 21, 1902.
P. KLINGER.
CARTRIDGE AND SHELL LOADER.
(Application filed Nov. 12, 1901.)
(No Model.) 6 Sheets—Sheet 4.

WITNESSES:
Fred D. Bradford.
Amos W. Hart.

INVENTOR
Peter Klinger.
BY Munn & Co.
ATTORNEYS

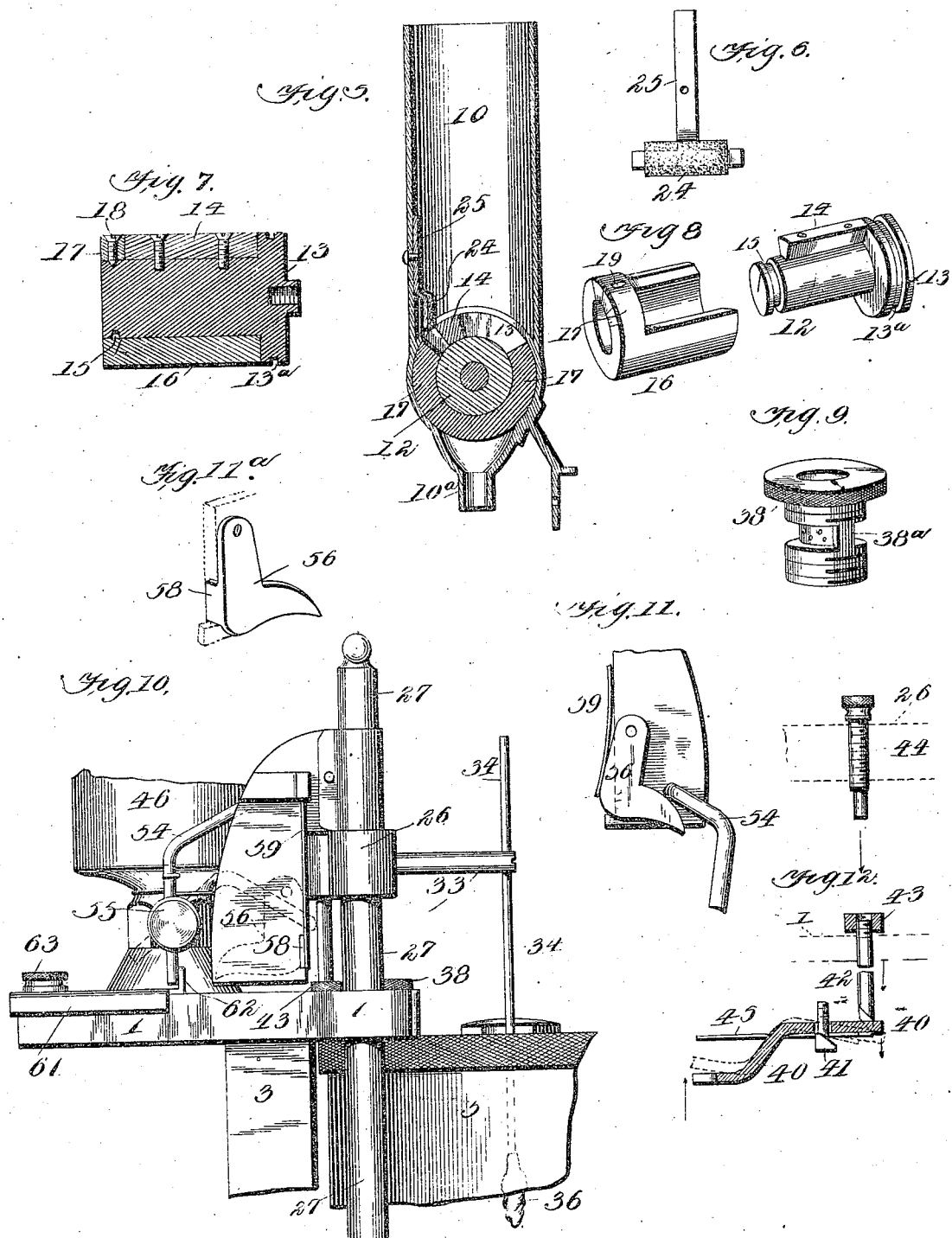

No. 711,870. Patented Oct. 21, 1902.
P. KLINGER.
CARTRIDGE AND SHELL LOADER.
(Application filed Nov. 12, 1901.)
(No Model.) 6 Sheets—Sheet 6.
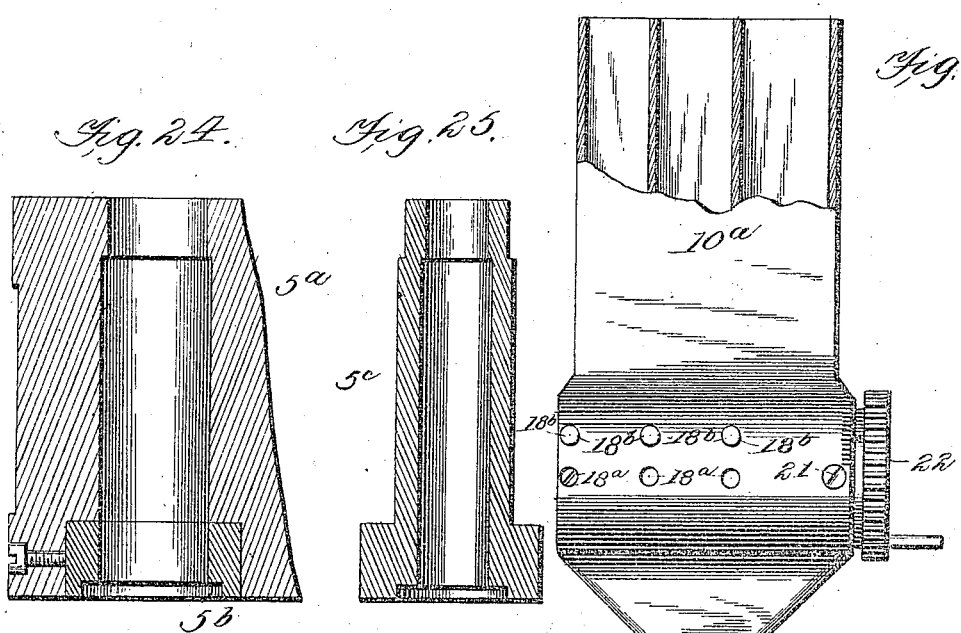
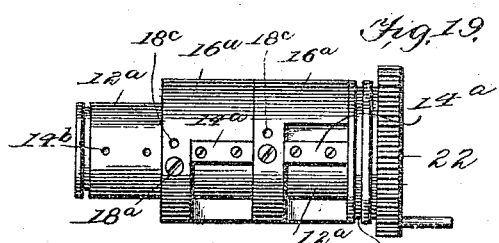
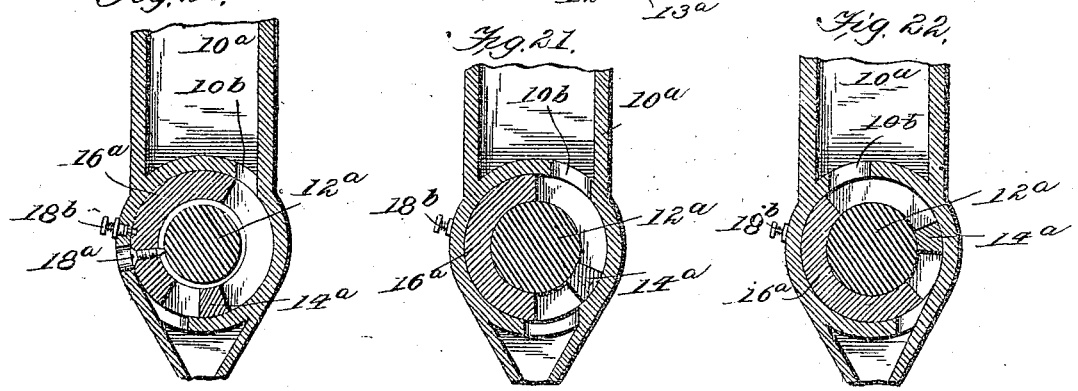
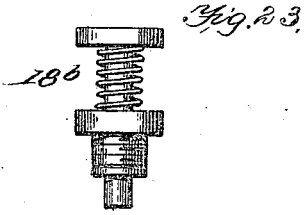
WITNESSES:
Fred P. Bradford
Amos W. Hart
INVENTOR
Peter Klinger
BY Munn & Co
ATTORNEYS

UNITED STATES PATENT OFFICE.

PETER KLINGER, OF MANSFIELD, ILLINOIS, ASSIGNOR OF ONE-HALF TO WILLIAM GIBSON WEBB, OF FARMER CITY, ILLINOIS.

CARTRIDGE AND SHELL LOADER.

SPECIFICATION forming part of Letters Patent No. 711,870, dated October 21, 1902.

Application filed November 12, 1901. Serial No. 82,069. (No model.)

*To all whom it may concern:*

Be it known that I, PETER KLINGER, a citizen of the United States, residing at Mansfield, in the county of Piatt and State of Illinois, have made certain useful Improvements in Cartridge and Shell Loaders, of which the following is a specification.

My invention is an improved machine for loading rifle and revolver cartridges and shotgun shells. It includes many features which are hereinafter described with reference to the accompanying drawings, in which—

Figure 1:
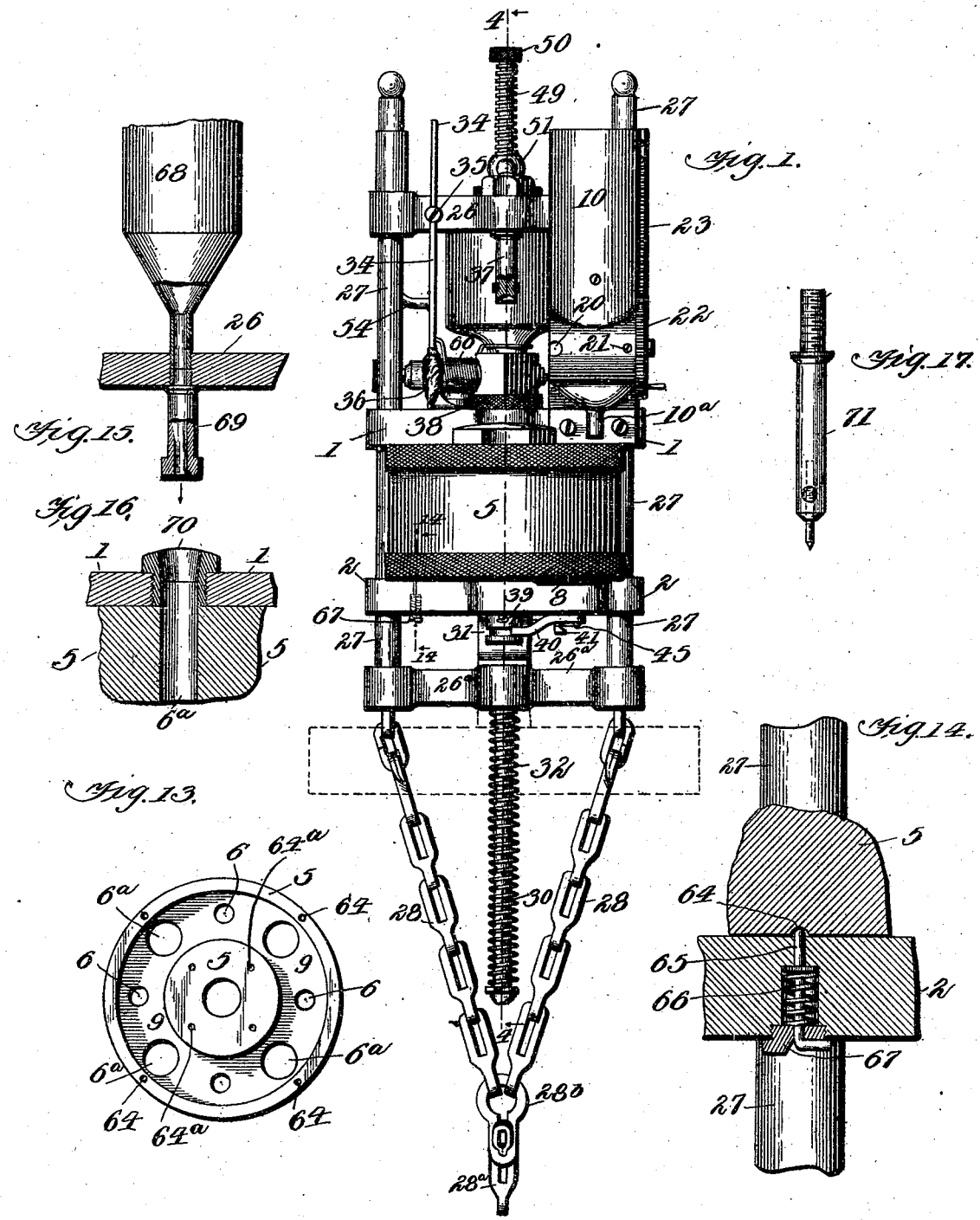
Figure 2:
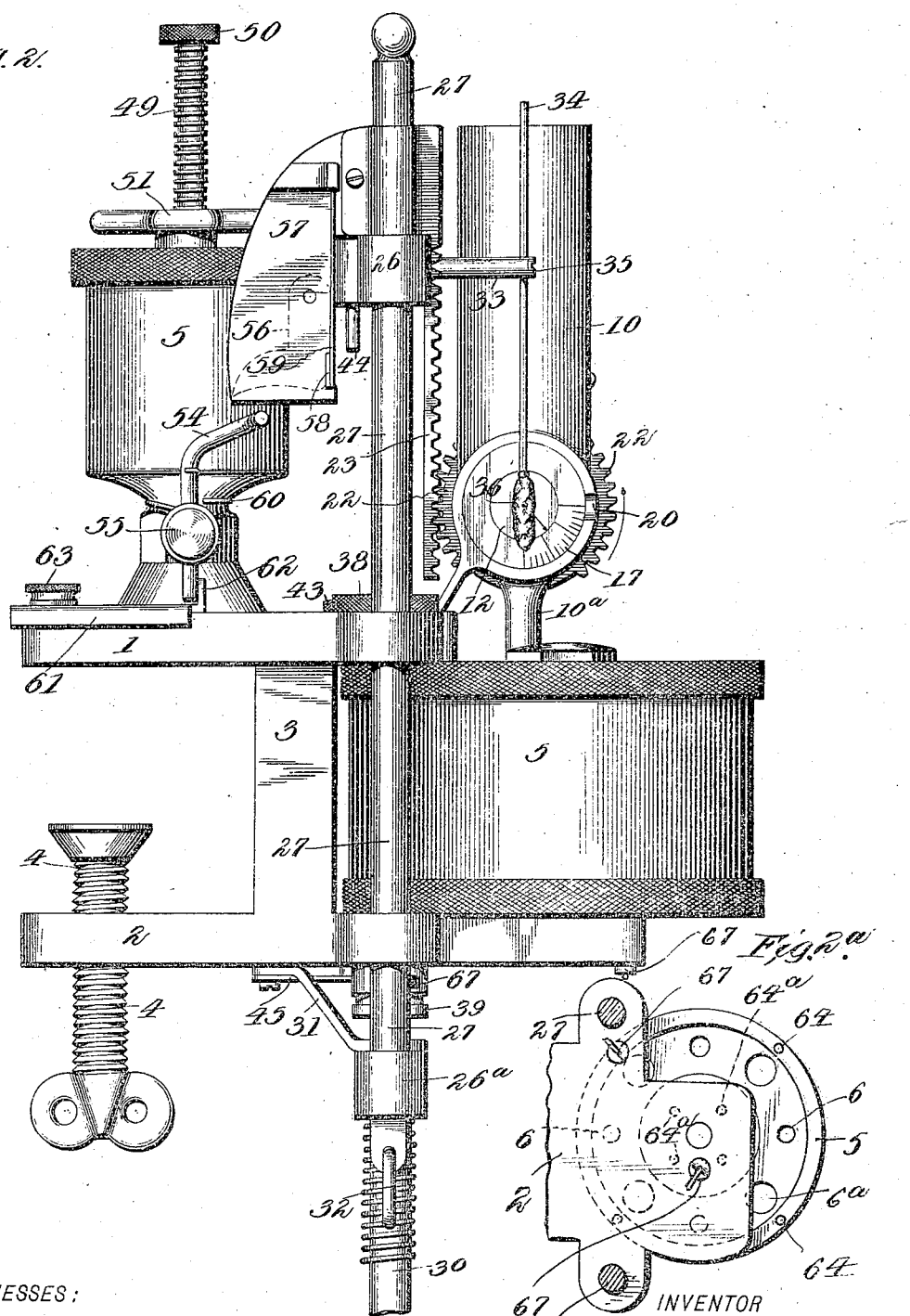
Figure 3:
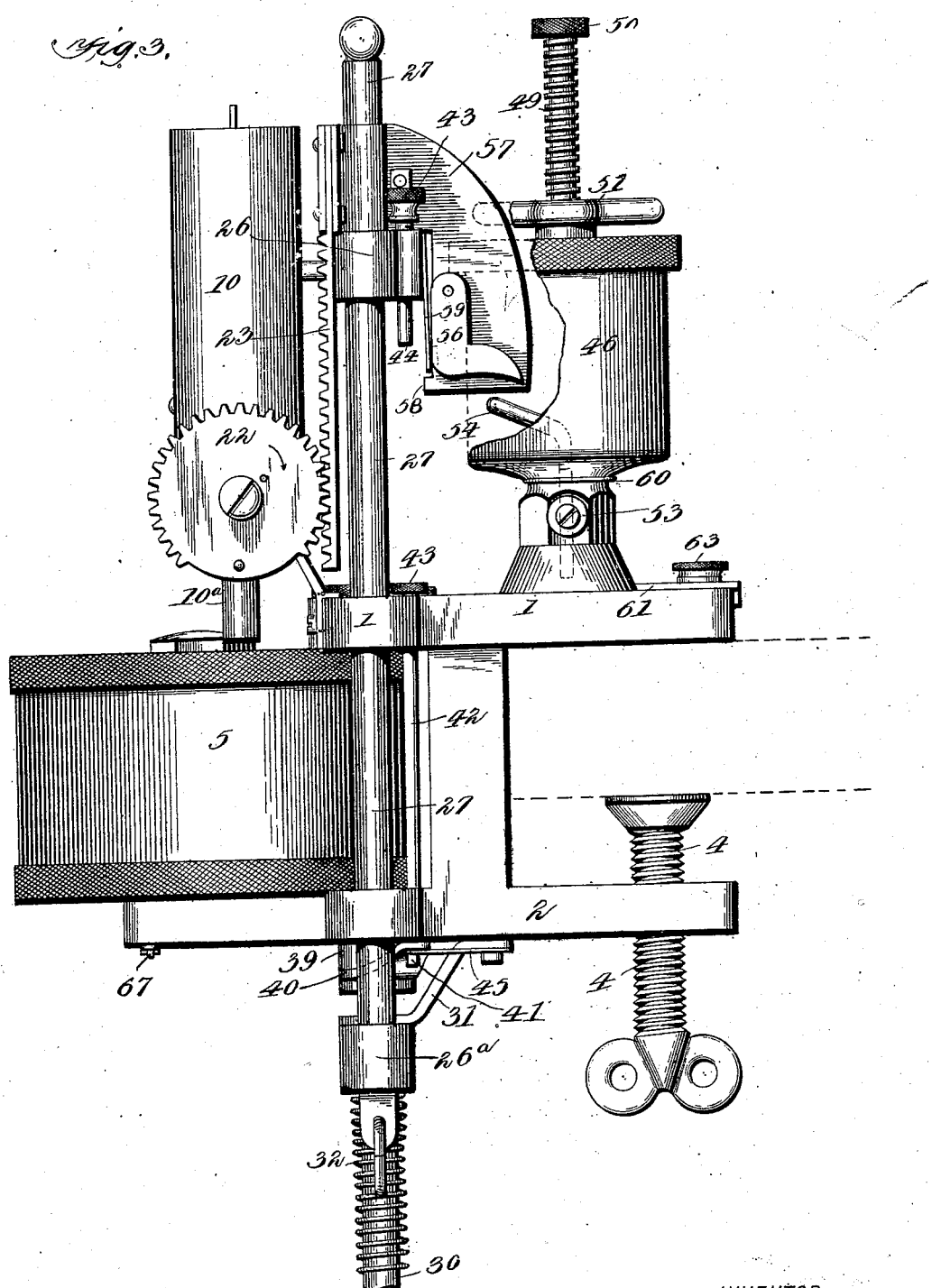
Figure 4:
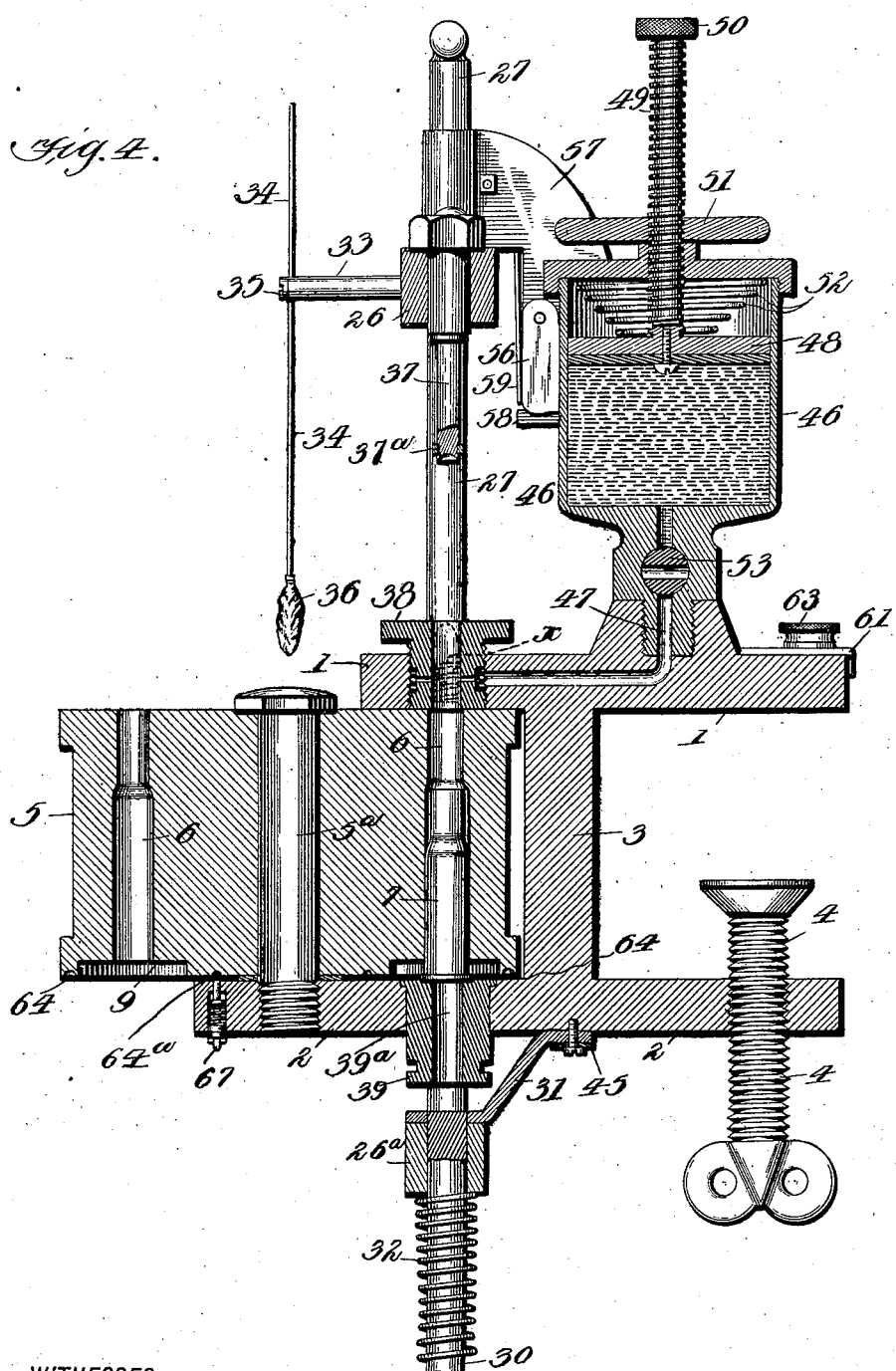

Figure 1 is a front view of the machine or apparatus. Fig. 2 is a side view of the main portion of the machine. Fig. 2ª is a bottom plan view of a portion of the machine, illustrating the arrangement of spring locking-pins for the rotatable shell-holding cylinder. Fig. 3 is a view of the opposite side of the same. Fig. 4 is a vertical central section of the machine save the lower portion. Fig. 5 is an enlarged vertical section of the powder-holder and rotary powder-gage arranged therein. Fig. 6 is a front view of a wiper arranged in the powder-holder. Fig. 7 is a central longitudinal section of the rotary powder-gage. Fig. 8 is a perspective view of the two parts of the powder-gage detached from each other. Fig. 9 is a perspective view of the die for resizing and lubricating bullets. Fig. 10 is a detail side view of the portion of the machine, showing the plunger and connected parts when forced down as required for ejecting the loaded cartridge or shell, forcing a bullet or wad into a cartridge or shell, and supplying a powder charge. Fig. 11 is a detail view of the trip connected with the grease or lubricant holder. Fig. 11ª is a perspective view of the cam which engages the trip-arm of the rotary plug controlling the discharge of lubricant from the holder. Fig. 12 is a sectional view illustrating certain details of the mechanism for crimping a cartridge. Fig. 13, Sheet 1, is a bottom plan view of the rotary cylinder in which the cartridges or shells are held while being filled. Fig. 14 is a detail view illustrating the spring-detainer for holding or locking the rotating cylinder while a cartridge or shell is being charged. Fig. 15 is a partly-sectional view showing a shot-holder connected with a hollow wad-driver, both of which are employed in filling shot-shells. Fig. 16 is a sectional view of the wad-guide for shot-shells. Fig. 17 is a side view of a cartridge or shell decapper. Fig. 18 is a side view, part being in section, of a modified construction of the powder-holder. Fig. 19 is a plan view of a powder-gage adapted for such multiple-chamber powder-holder. Figs. 20, 21, and 22 are vertical sections of the multiple-chamber powder-holder with gage adjusted in different positions. Fig. 23 is an enlarged side view of a spring locking pin or stop for locking one of the adjustable portions of the powder-gage. Fig. 24 is a vertical section of the rotatable shell-holding cylinder. Fig. 25 is a longitudinal section of a bushing or reducer for the chambers of the shell-cylinder.

The working parts of the machine or apparatus are mounted upon a rigid metal frame having a horizontal top portion 1, bottom portion 2, and a vertical web 3 connecting the same. (See especially Figs. 2, 3, and 4.) The rear portion of the parts 1 and 2 are separated by a space sufficient to receive the edge of a table or other support, to which the frame may be clamped by means of the screw 4. By this means the apparatus is held in a vertical position, as shown in the drawings. The lower portion 2 of the frame is extended at the front, and upon it is pivoted the cylinder 5 by the bolt 5ª, (shown in bottom plan in Fig. 13,) which is provided with vertical bores or openings for receiving rifle or revolver cartridges and also shot-shells when required.

I will describe the apparatus as adapted for charging and crimping rifle and revolver cartridges and subsequently refer to the attachments and changes required to adapt the apparatus for charging shot-shells.

As will be understood by reference to Fig. 4, the empty rifle and revolver cartridges 7 are inserted manually from beneath into the bores or sockets 6 in the revolving cylinder 5. Such a cartridge is inserted each time that one is filled or charged with powder, and it will be seen that the projection of the cylinder 5 beyond the part 2 of the frame allows this to be done. The cylinder 5 is then rotated to the right, (see arrow, Fig. 1,) whereby the cartridge thus inserted is carried round upon the platform provided by the foresaid projecting portion 2 of the frame. As shown at 8 in Fig. 1, this portion of the frame is beveled at the front edge to facilitate the passage of the flanged heads of the cartridges. As shown in Figs. 4 and 13, the cylinder 5 has an annular recess 9 in its under portion which provides ample space for reception of the flanged heads of the cartridges. To the upper portion 1 of the frame is rigidly attached a powder-holder 10, which is a hollow vertical cylinder having a reduced nozzle $10^a$, located in proper relation to the bores 6 of the revolving cylinder 5 to enable it to discharge thereinto, as hereinafter described.

Within the lower portion of the powder-holder 10 is arranged the rotatable powder-gage 11. (See Figs. 5, 7, and 8.) This gage is constructed of a cylindrical central portion 12, having an enlarged and circumferential grooved head 13 and a longitudinal radial wing 14; also, a circumferential groove 15 in its smaller end. The other portion 16 of the gage consists of a hemispherical hollow cylinder having a cylindrical end portion 17. The cylindrical part 12 is fitted into the cylinder 16, its grooved end 15 fitting in an opening provided in the cylindrical portion 17. As shown in Fig. 5, the radial wing 14 of the part 12 is arranged in the space formed between the straight edges of the half-cylinder 16. The space between such wing 14 and one of the said edges of the cylinder receives a powder charge. It is apparent that if the cylinder 12 be rotated one way or the other relatively to the half-cylinder 16 this powder space or chamber will be enlarged or contracted accordingly. Thus a convenient means is provided for regulating the powder charge. To secure the parts 12 and 16 in any required adjustment, I employ a clamp-screw 18, (see Fig. 7,) which passes through a hole 19 (see Fig. 8) in the circular portion 17 of the half-cylinder and enters the groove 15 in part 12. As shown in Figs. 1 and 2, the cylindrical lower portion of the powder-holder 10 is provided with an opening 20, through which the clamp-screw 18 may be conveniently reached by a screw-driver when it is required to effect a change in the powder-gage. As shown in Fig. 2, the end of the circular part of the half-cylinder 16 is graduated radially, and the end of the cylinder 12 is provided with a radial mark for the purpose of enabling the degree of adjustment, and thereby the size of the powder charge, to be easily and accurately determined. For the purpose of holding the powder-gage in the cylindrical lower portion of the powder-holder 10 a screw 21 (see Fig. 1) is inserted in such manner that its point enters the groove $13^a$, formed in the circular head 13. The powder-gage is rotated by means of a spur-gear 22 and a rack-bar 23. The said gear is arranged on a hub (see Fig. 7) projecting from the head 13 of the powder-gage and is duly secured in place by means of a clamp-screw. The gear 22 is rotated when the rack-bar 23 is forced down, a powder charge being thus carried around by the powder-gage and delivered through the reduced end $10^a$ of the powder-holder 10 into one of the bores 6 of the rotatable cylinder 5.

Within the powder-holder is arranged a wiper, (see Figs. 5 and 6,) which consists of a spring-shank 25 and a horizontal pad 24. The said shank is secured to the side of the holder 10, and the pad 24 works in frictional engagement with the rotatable powder-gage, whereby powder is prevented from access to the space adjacent to one side of the cylindrical part within which the powder-gage rotates. The aforesaid rack-bar 23 is secured to one end of a cross-bar 26. (See Figs. 1 and 3.) This cross-bar 26 connects the upper portion of two vertical slidable rods 27, which work in guides formed by coincident vertical openings in the parts 1 and 2 of the rigid frame of the apparatus. The said rods are connected at their lower ends by a cross-bar $26^a$, and from their lower ends depend chains 28, from which a single chain $28^a$ depends, (see Fig. 1,) the lower end of the same being bifurcated or divided and attached to a footpiece or treadle-bar 29. The lower cross-bar $26^a$, connecting the slidable rods 27, as above described, has an enlarged or thickened central portion which is provided with a vertical bore to receive a fixed guide-rod 30. The latter is attached to a bracket 31, secured to the end portion 2 of the rigid frame of the machine, and is provided at its lower end with an enlarged head formed of a nut. Between said nut and the cross-bar $26^a$ a spiral spring 32 is arranged, the same being coiled about the rod 30, as shown. It will now be apparent that the slidable frame consists of the two parallel cross-bars 26 and $26^a$ and parallel vertical rods 27 and is supported by the spring 32 in the normal positions shown in Figs. 1, 2, 3, and 4, but that by downward pressure on the footpiece 29 the said frame may be drawn downward to the required extent, which position is illustrated in Fig. 10, as will be hereinafter more fully described. As before intimated, such vertical depression of the frame 26 27 carries down the rack-bar 23 and rotates the powder-gage for effecting discharge of powder from the holder 10 into the cartridge that is immediately below it. The said slidable frame carries other attachments, as will now be described. From the top bar 26 projects a horizontal bar 33, (see especially Fig. 2,) in which a rod 34 is adapted to slide vertically, the same being secured by a clamp-screw 35. The rod 34 is thus adapted for any required vertical adjustment and has a twofold function—that is to say, its primary use is to eject a loaded cartridge or shot-shell from the cylinder 5, while it carries at its lower end a swab 36, which serves to wipe the lubricant out of the bores of the cylinder, as will be readily understood.

To the central portion of the top bar 26 of the slidable frame is attached a punch 37, (see Figs. 1 and 4,) whose lower end is provided with a socket or rounded cavity suitable to receive the conical end of a bullet or slug x, (see Fig. 4,) which is to be inserted in a cartridge-shell after the deposit of the powder charge therein. The said bullet is placed manually in the die 38, (see Fig. 4,) which is screwed into the upper portion 1 of the rigid frame of the machine. The bore of the die 38 is slightly reduced toward its lower end, as usual in resizing dies, and the bullet x is arrested by the contracted portion or shoulder thus formed, so that its grooves are opposite the lubricant-passage 47, as shown by dotted lines in Fig. 4. When the frame 26 27 descends, the lubricant reaches the bullet and fills its grooves just before the punch 37 strikes upon the bullet. The latter is forced through the die 38 into the coincident bore 6 of the rotatable cylinder 5 and also into the reduced end of the cartridge 7. The die 38 thus serves as a guide and also for resizing the bullet, so that it will fit in the cartridge with the required exactitude. The punch 37 is provided near its lower end with a circumferential swab 37ª, whose function is to remove from the upper portion of the die 38 any surplus lubricant which would otherwise be applied to and smear the lower end of a bullet inserted in the die. The upper end of the die 38 is provided with an enlarged milled flange for convenience in rotating it for insertion and removal. It will be understood that whenever the punch 37 is alined with a bore 6 of the rotatable cylinder 5 the ejector 34 is also alined with another bore containing a duly-charged cartridge, or, in other words, a complete bore-cartridge. As shown in Fig. 4, the bores 6 in the cylinder 5 have the same form as a cartridge; but the shoulder at the lower end of the reduced portion of the bore is so located that if the cartridge be forced up to a slight extent its end will be compressed and crimped upon the bullet x. Fig. 4 shows a cartridge 7 in position before this operation is begun. The flanged head of said cartridge rests upon a slidable block 39, (see also Figs. 1 and 2,) the same being supported by its flanged head in a vertical bore or part 2 of the frame. In its normal position the head-block 39 is flush with the upper surface of part 2 of the frame. It is apparent that if this block be forced upward the cartridge 7 will be forced into the reduced portion of the bore 6 in the cylinder 5, and thereby compressed and crimped, as required. To effect this result, I employ the following mechanism: Referring principally to Figs. 1, 3, and 12, it will be seen that an obtuse angle-lever 40 is pivoted upon a knife-edge support consisting of a screw 41, having a beveled head. The lower end of this lever 40 is cut out or forked to adapt it to engage a circumferential groove in the crimping-block 39. If this lever 40 be tilted, as indicated by the arrow in Fig. 12, the block 39 will be forced upward to effect the crimping operation. For this purpose a rod 42 (see Fig. 3) is arranged slidably in the frame portions 1 and 2, and its lower end, which is beveled, as shown in Fig. 12, rests upon the outer and upper end of the lever 40. The upper end of said rod 42 projects above the part 1 of the frame and is provided with a nut 43, which may be screwed up or down thereon, as may be required to regulate the movement of the rod 42, and thereby the throw of the lever 40. A punch 44 (see Fig. 3) is supported and secured in a lateral boss of the upper cross-bar 26 of the slidable frame and arranged in due vertical alinement with the aforesaid rod 42. It will now be apparent that when the slidable frame 26 27 is forced down the punch 44, striking upon the head of the rod 42, will cause the latter to tilt the lever 40 on its knife-edge pivot, and thereby raise the crimping-block 39. For supporting the lever 40 in the normal position shown in Fig. 12 and also supporting the rod 42, with its nut-head 43, raised slightly above the frame part 1, I arrange a plate-spring 45 in such manner as to press upward upon the outer end of the lever, as shown in several figures.

I provide means for automatically lubricating the bullet while on its way to the cartridge as follows: A lubricant-holder or grease-cup 46 is secured upon the frame part 1 in vertical position and screwed into a socket provided thereon. A passage 47 is formed in the lower portion of the lubricant-holder and also in part 1 of the frame, as shown in Fig. 4, through which the lubricant passes to the bullet-resizing die 38, before referred to. As shown in Fig. 9, this die has a circumferential groove 38ª, from which perforations extend through to the bore of the die. If the die 38 be adjusted with its groove in communication with the passage 47, it is apparent that lubricant may be forced through the same as required. If at any time it be desired to shut off the flow of lubricant, the die 9 may be adjusted for that purpose. Thus, as shown in Fig. 9, it is provided with a web or partition, which divides the groove 38ª and which serves when adjusted in coincidence with the passage 47 to entirely close the latter.

The lubricant-holder 46 is provided interiorly with a piston 48, which may be adjusted vertically by means of a screw 49, having a milled head 50 and a jam-nut 51. A spring 52 is arranged within the cup 46 between the head of the latter and the piston 48 and serves to aid in pressing the piston downward. In the lower portion of the lubricant-holder 46 is arranged a two-way cylindrical plug or cock 53, which is rotatable on its axis and adapted to close the passage 47 or open the same more or less, as will be required. This plug 53 is held normally in the position to close or cut off the passage 47, as shown in Fig. 4, and it is automatically rotated onequarter around, as required for effecting a momentary discharge of lubricant, by means which I will now describe. A bent lever-arm 54 is attached to the outer end of the plug or cock 53 (see especially Fig. 2) and projects upward and toward the sliding frame 26 27, before described. A screw 55, having an enlarged milled head, is employed for clamping the arm 54 in any required attachment in the plug 53. The upper end of this lever-arm 54 projects into the path of a cam 56, (see Fig. 3,) which is pivoted to a broad pendent arm or bracket 57, forming a rear attachment of one of the slidable rods 27—that is to say, the arm or bracket 57 is clamped upon the portion of such arm which projects above the upper cross-bar 26. The lateral projection or toe of the cam 56 strikes upon the lever-arm 54 when carried down with the bracket 57 and is prevented from tilting upward by means of a lateral lug 58, (see Fig. 18,) which engages the inner edge of the bracket 57. The cam is, however, adapted to yield in the opposite direction, as indicated in Fig. 11, a spring 59 being provided for retracting or forcing the cam back to its normal position. Thus when the slidable frame 26 27 is forced downward the cam 56, striking upon the lever-arm 54, forces it downward, and thereby rotates the plug or cock 53 to allow escape of a due quantity of lubricant into the passage 47; but when the slidable frame has reached the last limit of movement the free end of the lever-arm 54 passes around the back of the same, and when the slidable frame rises again the lever-arm strikes upon the lateral projection or toe of the cam 56, and thus passes by it and resumes its normal position. As shown in Fig. 1, a spiral spring 60 encircles the projecting shank or portion of the plug 53 and is secured to the lubricator proper at one end and to the lever-arm 54 at the other end, whereby it is adapted to restore the said parts to the normal position after each part rotation of the plug. As shown in Figs. 2 and 10, I employ a stop or gage 61 for arresting the rotary movement of the plug—that is to say, when the arm 54 is thrown back after passing the cam 56 it will be arrested in its normal position by the lip or flange 62, formed on the end of the slidable piece 61. The latter is a slotted and flanged plate adapted to slide on the part 1 of the frame and is clamped in the required adjustment by means of a screw 63. It is apparent that by adjustment of this stop 61 the position of the plug 53 and its degree of rotation may be so regulated as to vary the discharge of lubricant as conditions may require.

As shown best in Figs. 2ª and 13, the lower edge or circular flange of the rotary cylinder 5 is provided with a series of sockets 64 64ª, and, as shown in Fig. 14, these sockets receive a spring-actuated stop or lock 65, which is arranged in a bore in part 2 of the frame. (See also Fig. 1.) Stop 65 is provided with a flange, which works in an enlarged portion of the cavity or socket in part 2, and a spiral spring 66 is arranged between said flange and a screw-plug 67, inserted from below. It is apparent that the spring 66 will normally support the stop 65 in such position that it projects slightly above the upper surface of the frame part 2 and engages sockets 64 64ª and the cylinder 5. The outer locking-pin (see Fig. 2ª) engages sockets 64, which are opposite the shot-bores 6ª in the cylinder 5, while the inner pin engages sockets 64ª, which are also opposite the same bores 6. Thus the outer pin locks the cylinder when a bullet-bore is in register with the punch 37 and the inner pin locks the cylinder when a shot-bore is in register with the punch. It will be understood that when one locking-pin is allowed to engage the cylinder 5 the other is thrown out of such engagement, and vice versa. To provide for this, one side of the plug 67 (see Fig. 14) is cut away, and the pin 65 has a lateral arm or bent portion that rests on the plug. When such arm is on the high part of the plug 67, it holds the pin proper out of a socket in the cylinder, and when the arm is on the lower part of the plug the pin proper is engaged and locks the cylinder, as shown in Fig. 14. The sockets and the engaging head of the pin 65 being rounded, it will be seen that while the stop serves to hold the cylinder 5 in due position when a cartridge is being charged or discharged the engagement is not such as to prevent rotation of the cylinder upon the application of a slight degree of force.

The chains 28 and 28ª, before referred to, are adjustably connected by means of a buckle 28ᵇ, (see Fig. 1,) which is formed with a keyhole-slot. The chains 28 are attached to the enlarged upper portion of this buckle and the chain 28ª is adjustably connected therewith—that is to say, the links of the chain 28ª have a reduced portion which is adapted to fit in the similar portion of the slot of the buckle 28ᵇ, and the size of the enlarged portion of the slot is relatively such that the chain 28ª may be drawn through the same. It will thus be seen that the chain 28ª may be drawn through the buckle 28ᵇ and any one of its links engaged therewith, as required, to adjust the footpiece 29 at any required height to accommodate the height of any support to which the apparatus may be attached or to accommodate the height of different apertures.

I have indicated in Fig. 1 by dotted lines below the cross-bar 26ª the position of a tray which is employed in practice in connection with the apparatus for holding and receiving cartridges or shells before and after charging; but since this tray forms no part of the operating mechanism it is unnecessary to describe it in detail.

I will briefly recapitulate the operation of the machine. The powder-holder 10 being duly filled, a cartridge is inserted from beneath in a bore 6 of the cylinder 5, and the latter is then rotated to bring said cartridge into alinement with the nozzle 10ª of the powder-holder, which position will be readily determined visually and also mechanically by engagement of the spring-stop 65 with that socket of the cylinder 5 which is directly opposite or adjacent to the bore 6, containing the cartridge which is to be charged. Then the operator pressing down upon the footpiece 29 draws the slidable frame 26 27 downward against the tension of the spring 32, whereby the rack-bar 23 rotates the powder-gage through the medium of the cog-wheel 22 and effects the discharge of a due quantity of powder from the holder into the cartridge below. The operator then releases the treadle or footpiece 29, and the spring 32 forces the slidable frame back to its normal position. The operator then inserts another cartridge and rotates the cylinder 5 manually one step, and thereby an unfilled cartridge is brought beneath the powder-holder 10. Meanwhile the cartridge which had previously received a charge of powder passes into the position shown in Fig. 4, where it is alined with the bullet-resizing die 38 and the bullet plunger or punch 37, so that when the frame 26 27 is again drawn down to charge the unfilled cartridge the punch 37 will force the bullet $x$, which the operator places upon the die 38, into the bore 6 and into the cartridge 7 below. At the same instant the punch 44 acts upon the rod 42 (see Fig. 3) and forces the latter down, so as to tilt the lever 40, (see Fig. 12,) and thereby raise the crimping-block 39, which forces the cartridge upward and crimps its upper end upon the bullet, as described. Simultaneously with the operations thus far described the lubricant is automatically forced into the resizing-die 38 by reason of engagement of the cam 56 with the lever-arm 54 of the two-way block 53, whereby the latter is rotated to bring its bore into coincidence with the lubricant-passage 47. As the slidable frame 26 27 rises again the lever-arm 54 passes around the cam 56 and passes by it, as shown in Fig. 11, and is restored to its normal position by the spring 60 and stop 61. Further, simultaneously with the above-described operation the plunger or punch 34 descends and ejects the charged cartridge— that is to say, the complete ball-cartridge— from the cylinder. When the tray before referred to is employed, the ball-cartridge thus discharged will fall directly into one of these compartments. It will be understood that I might provide any other suitable receptacle for the cartridges when thus discharged from the apparatus. While the cylinder 5 is rotated manually, it is apparent that it might be rotated automatically by arranging a suitable mechanism between it and the slidable frame 26 27.

In order to prepare the machine for filling shot-cartridges, I attach a shot-holder 68 (see Fig. 15) in alinement with a hollow punch or plunger 69, which is adapted for driving wads. This plunger 69 is applied in place of the bullet-punch shown prominently in Figs. 1 and 4. The shot-holder 68 may be screwed into the slidable bar 26, as shown, and the punch 69 may be similarly attached on the under side of said bar, or the shot-holder may be screwed directly into the punch, whose screw-tenon would in that case be suitably enlarged to receive the same. The shot-holder 68 will in practice be provided with a shot-gage similar to the powder-gage before described, which device it is unnecessary to describe in detail. The punch 69 is enlarged at its lower end and adapted to fit in a wad-guide 70, (see Fig. 16,) which is enlarged or flared in its upper portion. The said wad-guide is screwed into part 1 of the frame in place of the bullet-resizing die 38. When shot-shells are to be filled, the lubricating mechanism is thrown out of action by loosening the screw 63, (see Fig. 10,) whereby the stop or gage 61 is released, and the spring 60 then throws the arm 54 back so that it cannot engage the cam 56. The cylinder 5 is provided with a series of holes or vertical bores 6ª, adapted to receive shot cartridges or shells in the same manner as the bores 6 are adapted to receive bullet-cartridges, as before described. The operation of charging shot cartridges or shells is essentially the same as for charging a bullet-cartridge, it being understood that wads are to be placed over the powder and over the shot. It will be further understood that the frame 26 27 requires to be forced down twice in order to push the powder-wad and the shot-wad into place in the cartridge or shell. The shot-shells are crimped for holding charge in place by a subsequent operation.

I illustrate in Fig. 18 a multiple-chamber powder-holder 10ª, and in Fig. 19 a multiple gage therefor. The gage is constructed practically like the single gage before described, save that the core or body 12ª is extended to a length sufficient to accommodate three adjustable parts or gage-rings 16ª. In Fig. 19 two such rings are shown applied, the other or third one being detached for the sake of better illustration. It will be seen that three radial wings 14ª are secured to the core or body 12ª by means of screws inserted in holes 14ᵇ. The three wings 14ª are in line with each other. The collars or rings 16ª are secured to the core 12ª by screws 18ª, and by adjusting these circumferentially with reference to the wings 14ª it is apparent that the spaces for the powder may be enlarged or contracted, as required. The application of the screws 18ª is illustrated in section, Fig. 20, the points of the screws entering the circumferential grooves in the core or body 12ª. As shown in Figs. 20, 21, and 22, the discharge-openings 10ᵇ of the several powder-chambers are not located at the same point, and the rings or collars 16ª are adjusted in different positions, as conditions require. It is obvious that by this apparatus three charges of different kinds of powder may be discharged simultaneously from the powder-holder, or the adjustment may be such that they may be discharged *seriatim*. In order to adjust any one of the rings or collars 16ª, I employ a spring stop or pin 18ᵇ, (see Fig. 23,) the same consisting of the pin proper having an enlarged head and working through a screw-nut, between which head and nut is arranged a spiral spring. The pin proper is thus held normally restricted. This arrangement is shown in Fig. 20. When it is desired to adjust the collar or ring 16ª for the purpose of changing the gage, the latter is rotated to bring the screw 18ª of the particular ring or collar into coincidence with the lateral opening in the surrounding shell or cylinder of the powder-holder. Then the spring-stop 18ᵇ is pushed in to lock the collar or ring 16ª, which it does by entering a socket 18ᶜ, (see Fig. 19,) located adjacent to the screw 18ª, and a screw-driver is applied to loosen the screw 18ª, whereupon the core 12ª is rotated such distance as may be required to effect the desired change in the gage. The screw 18ª is screwed as before, and the pressure on the spring-stop 18ᵇ is released. It will be understood that the degree of rotation of the core or body 12ª of the gage is determined by the graduated scale shown in Fig. 18.

I preferably provide the rotatable shell-cylinder 5ª with an inserted collar 5ᵇ, which is held in a socket, as shown in Fig. 24, by means of a clamp-screw. The bore is adapted for reception, say, of a ten-gage shaft. To adapt it for a smaller gage—say sixteen—a bushing 5ᶜ (see Fig. 25) is inserted in the bore shown in Fig. 24, the collar 5ᵇ being first removed. It is obvious that by this construction and the provision of a series of bushings the shell-cylinder may be adapted for reception of a charging of shot-shells of various sizes.

When it is required to decap shells, the device 71 (shown in Fig. 17, Sheet 1) is attached to the bar 26 of the slidable frame in place of the bullet-punch 37 or wad-driver 69. Then when the frame 26 27 is forced down the pin held adjustably in the end of the device 71 will strike upon and force out a cap attached to a cartridge held in the coincident bore of the cylinder 5. The cap thus removed will fall through the central passage 39ª (see Fig. 4) in the crimping-block 39.

Having thus described my invention, what I claim as new, and desire to secure by Letters Patent, is—

1. The combination with a suitable frame and a cylinder pivoted and rotatable therein, and provided with a series of bores having a reduced upper portion, and also with a recess in its under side which permits upward movement of the head of the cartridge, of a slidable block arranged in said frame in such relation that, as the cylinder is rotated, its bores are brought successively over said block, a lever adapted to engage the block, and a slidable frame, and means connected with said lever, which, when the frame descends, act on said lever for the purpose of raising the aforesaid block and thereby effecting the crimping of the cartridges, substantially as shown and described.

2. The combination with a suitable frame and a rotatable cylinder pivoted therein and provided with a series of cartridge-bores having a reduced upper portion for crimping as desired, of a block adapted to slide in the said frame and arranged to register with said bores as the cylinder is rotated, a lever connected with said block and fulcrumed on the frame, and a rod adapted to act on said lever for tilting it, and means for forcing said rod downward, and a spring for holding the lever in normal position, substantially as shown and described.

3. The combination with a suitable frame and a cylinder or other block having a cartridge-bore whose upper portion is reduced for crimping as described, a slidable block arranged for coincidence with said bore, a pivoted lever engaging the said block, a rod slidable in the frame and having an adjustable head for limiting its downward movement, and means for acting on said rod for depressing it and thereby tilting the lever and raising the crimping-block, and means for holding the lever in normal position, whereby the said rod is supported with its head elevated above the frame, substantially as shown and described.

4. The combination with a suitable frame, a cartridge-holder having a bore which is reduced in its upper portion, of a slidable block arranged for coincidence with said bore, a pivoted lever connected with the block, a rod arranged vertically, and bearing upon the outer end of said lever, a frame which is slidable vertically and carries a punch or pin adapted for contact with said rod, whereby, when said frame descends, the rod is forced downward and the crimping-block thereby elevated for forcing a cartridge upward in the bore, substantially as shown and described.

5. The combination with a suitable frame and a cylinder pivoted and rotatable therein and provided with a series of cartridge-crimping bores, of a slidable block arranged for coincidence with said bores as the cylinder is rotated, a lever for raising said block, a slidable rod adapted to act on said lever and projecting above the frame, a slidable frame working in the first-named or fixed frame, and a punch or pin attached to a slidable frame and vertically adjustable therein, the same being arranged in alinement with the aforesaid rod, for striking thereon when the slidable frame is depressed, substantially as shown and described.

6. The combination with a suitable frame, and a cartridge-holder having a cartridge-bore which is reduced in its upper portion, of a block which is slidable in said frame, a lever engaging the said block, a fulcrum for said lever, consisting of a screw or pin having its upper edge beveled as shown, a rod bearing upon the outer end of said lever and beveled as shown, the said rod being slidable in the frame, and means for depressing said rod for tilting the lever and raising the crimping-block, substantially as shown and described.

7. The combination with a powder-holder, of a cylindrical rotatable powder-gage arranged in the lower portion thereof, and composed of two main parts, one of which is practically a hemispherical hollow cylinder and the other a solid cylinder provided with a radial wing, the two parts being adapted to be fitted together the one within the other, and means for locking them in any adjustment, whereby the capacity of the powder chamber or recess may be varied at will, substantially as shown and described.

8. The improved powder-gage composed of a hollow half-cylinder having a circular end portion and a solid cylinder adapted to fit and rotate within the half-cylinder and provided with a radial wing as specified, and a clamp-screw passing through the circular portion of the half-cylinder and engaging the winged part of the cylinder, substantially as shown and described.

9. The combination with a powder-holder having a cylindrical socket in its lower portion, of a rotatable powder-gage comprising two parts which are adjustable circumferentially with relation to each other, means for locking them in any adjustment required to vary the capacity of a powder-chamber, the said powder-gage being provided with a circular grooved head, and a screw inserted through the powder-holder and entering said groove, whereby the powder-gage is held in due position but permitted to rotate freely, substantially as shown and described.

10. The combination with a powder-holder having a cylindrical socket in its lower portion, of a rotatable powder-gage comprising a rotatable core, a wing or radial projection thereof, a collar half-ring which is adjustable around said core, a stop-pin for engaging such ring, and means for securing the ring in any adjustment, as shown and described.

11. The combination with the multiple-chamber powder-holder having a common discharge-orifice and the multiple gage composed of a central rotatable portion, having a series of radial wings and a series of independent circumferentially-adjustable parts which may be set with reference to said wings, to enlarge or diminish the powder charge, as specified.

12. The combination with the rotatable shell-cylinder having a series of bores for bullet and shot shells two series of spring locking-pins each of which is adapted to be held in or out of engagement with the cylinder, as shown and described.

13. The combination with the rotatable shell-cylinder having two sets of bores, of two sets of spring locking-pins and plugs in which the same work, the said pins having bent outer ends and the heads of the plugs being cut away on one side, substantially as shown and described.

14. The combination of a suitable fixed frame having a bullet-guide and resizing-die arranged therein, and a rotatable cylinder pivoted in said frame and having a series of cartridge-bores adapted to be brought into coincidence with such die, of a frame adapted to slide vertically in said fixed frame, and having a punch attached to its upper portion and adapted to enter the said die, for forcing a bullet through it and into the cartridge, and means for normally supporting the slidable frame in an elevated position, substantially as shown and described.

15. The combination of a suitable fixed frame and a cartridge-holding cylinder pivoted therein, of a slidable frame carrying a vertical punch which is provided with a swab and arranged in such relation to the cylinder, that when the slidable frame is depressed the said punch and swab are adapted to enter a bore of the cylinder, substantially as shown and described.

16. The combination with a suitable fixed frame and a rotatable cylinder pivoted therein, of a vertical slidable frame composed of vertical and transverse bars, a die arranged in said fixed frame in coincident relation with the bores of the cylinder, a punch attached to the upper cross-bar of the frame and adapted to enter said die, a cartridge-ejecting punch also attached to said frame and adapted to enter any bore of the cylinder, means for locking the said cylinder automatically when any two of its bores are in vertical alinement with the aforesaid punches, and means for depressing the slidable frame, substantially as shown and described.

17. The combination with a suitable fixed frame having a vertical guide-rod rigidly secured to its end portion, and a spring encircling the same, of a slidable frame composed of parallel side rods and parallel cross-bars, the lower cross-bar being slidable upon the aforesaid rod and resting upon the spring, and means for applying traction to the slidable frame, substantially as shown and described.

18. The improved machine or apparatus for the purpose specified, comprising a fixed frame, a cartridge-holder, a powder-holder, means for regulating discharge of powder from the latter, a slidable frame which is suitably held and guided in the fixed frame, and a traction-chain depending from such slidable frame and including a footpiece and a buckle connecting the upper and lower portions of the chain, the same having a keyhole-slot whose upper portion exceeds the diameter of the links of the lower portion of the chain, and whose narrow portion is less than the width of such links, whereby the chain is adapted for contraction or expansion as required in operating the machine, substantially as shown and described.

19. The combination with a suitable fixed frame, and a cartridge-holder arranged therein, of a lubricant-holder and a passage extending therefrom, and communicating with the cartridge-bore, a rotatable plug arranged in said passage, and a vertical slidable frame guided in said fixed frame, means connected with the slidable frame for rotating the said plug, and means for retracting the plug subsequent to each rotation, substantially as shown and described.

20. The combination with a fixed frame of a lubricant-holder, a passage leading therefrom, a cartridge-holder having one or more bores adapted to be brought into communication with said passage, a rotary plug arranged in said passage and having a projecting arm, a vertical slidable frame having a projecting part adapted to engage said arm for rotating the plug, and a spring for retracting the plug subsequent to each partial rotation, substantially as shown and described.

21. The combination with the suitable frame, and a cartridge-holder having a bore as specified, of a lubricant-holder attached to said frame, and a passage extending therefrom to a point where it communicates with a cartridge-bore, a rotary plug for opening and closing said passage, a lever-arm projecting from the plug, a slidable frame, and a pivoted cam connected therewith and adapted to engage said lever-arm, the arrangement being such that the arm is depressed by said cam as the slidable frame descends and is tripped and yields as the said arm ascends, substantially as shown and described.

22. The combination with a suitable frame and a lubricant-holder, of a plug which is rotatable and adapted to open and close the discharge-passage of the holder, an arm attached to said rotary plug, a spring for retracting it, a stop for regulating the retractile movement of the plug, a frame which is slidable in said fixed frame, a pivoted cam connected therewith and adapted to engage the lever-arm of the plug, a spring pressing upon the said cam for holding it in the normal position, and a stop for preventing movement of the cam when tripping the plug, substantially as shown and described.

23. The combination with a fixed frame, and a cartridge-holder, of a bullet die or guide arranged in said frame and having radial openings, a lubricant-holder fixed on the frame and having a passage that communicates with the openings in the die, a plug or valve adapted for opening and closing the said passage, and means for operating said valve, substantially as shown and described.

24. The combination with a fixed frame and a lubricant-holder, and a passage leading from the latter, of a bullet die or guide having one or more radial openings or cut-out portions adapted to be brought into coincidence with the aforesaid passage and with non-cut-out portions adapted for closing the passage, substantially as shown and described.

25. The combination of a suitable fixed frame, and a lubricant-holder arranged thereon, a rotatable cylinder having a series of cartridge-bores, a bullet-die arranged in the frame, a passage connecting the same with the lubricant-holder, a rotary plug arranged in said passage, a frame which is slidable in the fixed frame, and means connected with the slidable frame for tripping the said plug, substantially as shown and described.

PETER KLINGER.

Witnesses:
F. L. EWING,
HENRY STODDARD.